(12) United States Patent
Wang et al.

(10) Patent No.: US 12,210,879 B2
(45) Date of Patent: Jan. 28, 2025

(54) DATA HAZARD GENERATION

(71) Applicant: Huawei Technologies Co., Ltd., Shenzhen (CN)

(72) Inventors: Jingliang Wang, Austin, TX (US); Michael Brothers, Austin, TX (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 42 days.

(21) Appl. No.: 18/061,205

(22) Filed: Dec. 2, 2022

(65) Prior Publication Data

US 2023/0101206 A1  Mar. 30, 2023

Related U.S. Application Data

(63) Continuation of application No. PCT/US2021/035711, filed on Jun. 3, 2021.

(60) Provisional application No. 63/034,784, filed on Jun. 4, 2020.

(51) Int. Cl.
*G06F 9/38* (2018.01)

(52) U.S. Cl.
CPC .................. *G06F 9/3838* (2013.01)

(58) Field of Classification Search
CPC ...... G06F 8/433; G06F 8/441; G06F 9/30007; G06F 9/30032; G06F 9/30043; G06F 9/30098; G06F 9/3824; G06F 9/3826; G06F 9/3828; G06F 9/3834; G06F 9/3836; G06F 9/3838; G06F 11/2236; G06F 11/2273; G06F 11/263; G06F 11/28; G06F 11/3024; G06F 11/3051; G06F 11/3668; G06F 11/3684
See application file for complete search history.

(56) References Cited

U.S. PATENT DOCUMENTS

| | | | |
|---|---|---|---|
| 5,889,974 A * | 3/1999 | Harriman ................ | G06F 11/28 714/E11.178 |
| 6,772,370 B1 * | 8/2004 | Sun ...................... | G06F 11/3684 712/216 |
| 2001/0014957 A1 * | 8/2001 | Oura .................... | G06F 11/2236 714/E11.166 |
| 2007/0260856 A1 | 11/2007 | Tran et al. | |
| 2010/0058034 A1 * | 3/2010 | Zaks ...................... | G06F 8/441 712/216 |

(Continued)

*Primary Examiner* — Courtney P Spann
*Assistant Examiner* — Kasim Alli
(74) *Attorney, Agent, or Firm* — Slater Matsil, LLP

(57) ABSTRACT

Implementations are directed to methods, systems, and computer-readable media for data hazard generation for instruction sequence generation. In one aspect, a computer-implemented method includes: obtaining data hazard information defining a data hazard to be generated during computer instruction generation, the data hazard specifying a data dependency between a first instruction and a second instruction occurring after the first instruction, and generating, based on the data hazard information and register usage data of a plurality of registers, an instruction for execution in a current processing cycle that satisfies the data dependency specified by the data hazard. The register usage data specifies, for each register of the plurality of registers, whether data was read from or written into the register in a plurality of processing cycles preceding the current processing cycle.

20 Claims, 5 Drawing Sheets

(56) References Cited

U.S. PATENT DOCUMENTS

| | | | |
|---|---|---|---|
| 2015/0046688 A1* | 2/2015 | Inoue | G06F 9/3012 |
| | | | 712/227 |
| 2017/0161073 A1* | 6/2017 | Chen | G06F 11/3632 |
| 2019/0354371 A1* | 11/2019 | Pattnaik | G06F 11/3024 |
| 2019/0362460 A1 | 11/2019 | Maiyuran et al. | |

* cited by examiner

DATA HAZARD GENERATION

CROSS-REFERENCE TO RELATED APPLICATIONS

This application is a continuation of Application No. PCT/US2021/035711, filed on Jun. 3, 2021, which claims the benefit of U.S. Application Ser. No. 63/034,784, filed on Jun. 4, 2020, applications of which are incorporated herein by reference in their entireties.

TECHNICAL FIELD

The present disclosure generally relates to instruction sequence generation during central processing unit (CPU) design verification and, more particularly, to data hazard generation during instruction sequence generation.

BACKGROUND

Pre-silicon verification of a CPU design is used to test the states and functional correctness of the design, which is modeled typically in a hardware design language, such as VHDL or Verilog. An instruction sequence generator (ISG) can be used in such testing/verification of a CPU design, e.g., by generating test sequences of instructions for simulation during testing of the CPU design. By simulating different sequences of instructions, errors and bugs with the CPU design can be identified and the different functions of the CPU design in all its possible states can be tested. Verification of the complete design of complex microprocessors and system on chips (SoCs) can be resource intensive, requiring large amounts of memory, and processing power, due to the large number of states and functions in the CPU design space. Accordingly, it is challenging to develop a verification methodology to effectively and efficiently verify the CPU's design.

SUMMARY

One aspect of CPU design verification generally includes testing to determine whether the CPU design correctly resolves data hazards. A data hazard specifies a data dependency between instructions near enough to each other, such that overlapping execution of the instructions may violate a data dependency order of the program. As one example, to obey a program order requiring writing to a register after data has been read from it, a second instruction that that writes to a register should not be allowed to execute until a first instruction that read data from the register has been executed. To verify that a CPU design resolves this and other data hazards correctly, it is useful to intentionally generate sequences with data hazards with which to exercise the design. However, doing so with high randomness is tedious and intractable if performed manually.

The techniques described in this specification, as summarized here and described further throughout the specification, provide a data hazard generation mechanism, e.g., implemented by an instruction sequence generator (ISG) that is configured to enable a user (e.g., a verification engineer) to automatically generate instruction sequences containing specifiable data hazards. The instruction sequence generator can keep track of register access history (which is also referred to as register usage history or data), e.g., over a sliding window of generated instructions. The register access history can be used by the ISG in generating instruction sequences that produce the specified data hazards. In some implementations, the verification engineer can specify options/parameters of data hazards that direct the generation of data hazards as part of generating a test program and the generated test program can then be used in testing the CPU design. The techniques described herein are not limited to registers, and other types of resource or memory components can also be tracked and used as part of data hazard generation in instruction sequence generation.

The embodiments of this disclosure may include systems, apparatus, software, and computer-implemented methods for data hazard generation for instruction sequence generation. In one aspect, a method can include at obtaining data hazard information defining a data hazard condition (which, for brevity is referred to herein as simply "data hazard") to be generated during computer instruction generation, wherein the data hazard condition (or simply, data hazard) specifies a data dependency between a first instruction and a second instruction occurring after the first instruction; and generating, based on the data hazard information and register usage data of a plurality of registers, an instruction for execution in a current processing cycle that satisfies the data dependency specified by the data hazard, wherein the register usage data specifies, for each register of the plurality of registers, whether data was read from or written into the register in a plurality of processing cycles preceding the current processing cycle.

Other implementations of this aspect include corresponding systems, apparatus, and computer programs, configured to perform the actions of the methods, encoded on computer storage devices. These and other embodiments can each optionally include one or more of the following features.

In some implementations, the data hazard information defining the data hazard can include at least one of a dependency type of the data hazard, a dependency depth of the data hazard, or a statistical distribution of dependency depths of data hazards to be generated among instruction sequences.

In some implementations, the dependency type of the data hazard can include one of read-after-write, write-after-write, or write-after-read.

In some implementations, the method can include determining, for each processing cycle of the plurality of processing cycles, corresponding usage data of each of the plurality of registers; and updating the register usage data of each of the plurality of registers with the corresponding usage data.

In some implementations, the register usage data of the plurality of registers is stored in a register usage data structure.

In some implementations, generating the instruction that satisfies the data dependency specified by the data hazard can include selecting, using data in the register usage data structure, a particular register that satisfies the data dependency specified by the data hazard and generating the instruction to access the selected particular register.

In some implementations, selecting the particular register can include selecting the particular register from among a plurality of registers that is not being used in instruction generation related to another data hazard.

In some implementations, the method can include, prior to generating the instruction that satisfies the data dependency specified by the data hazard, determining a count of registers in a plurality of registers which (1) have been accessed in a first set of preceding processing cycles and (2) have not been re-accessed in a second set of preceding processing cycles that follow the first set of preceding processing cycles.

In some implementations, generating the instruction that satisfies the data dependency specified by the data hazard can include: in response to determining that count of registers in the plurality of registers satisfies a particular threshold, generating the instruction that satisfies the data dependency specified by the data hazard.

In some implementations, the data hazard information can include the particular threshold.

In some implementations, obtaining data hazard information defining the data hazard to be generated during the instruction generation can include receiving a user input specifying the data hazard information.

The present disclosure also provides non-transitory computer-readable media coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a non-transitory computer-readable media device coupled to the one or more processors having instructions stored thereon which, when executed by the one or more processors, cause the one or more processors to perform operations in accordance with implementations of the methods provided herein.

The subject matter described in this specification can be implemented in particular embodiments to realize one or more of the following advantages. For example, implementations of the specification can generate data hazards using a random instruction stream generation tool, which can be applied to greatly increase the coverage of different states and functions of the CPU design and shorten the verification cycle in generic instruction set architecture (ISA) CPU design verification. The techniques described herein can save computing resources and time that would otherwise be required in manually configuring a test program to generate data hazards, while also retaining both randomness and an instruction stream simulator (ISS) feedback valued in the instruction sequence generator. Relatedly, while manually writing or configuring (e.g., using compile time macros) can produce a data hazard rich sequence, such techniques are not random. In contrast, the techniques described herein monitor register usage history in determining the registers to be selected for the dependency generation. In this manner, the register usage history is dynamically rather than statically determined during runtime, therefore better realizing the principle of randomness in stochastic testing. Additionally, the techniques described herein ensure the accuracy of the generated dependencies, rather than requiring the verification engineer to manually verify them.

The techniques described herein can also enable a user to specify depth of dependencies and other parameters for data hazards that are used to automatically generate and test various data hazards that can occur in operation.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION OF ILLUSTRATIVE EMBODIMENTS

Figure 1:
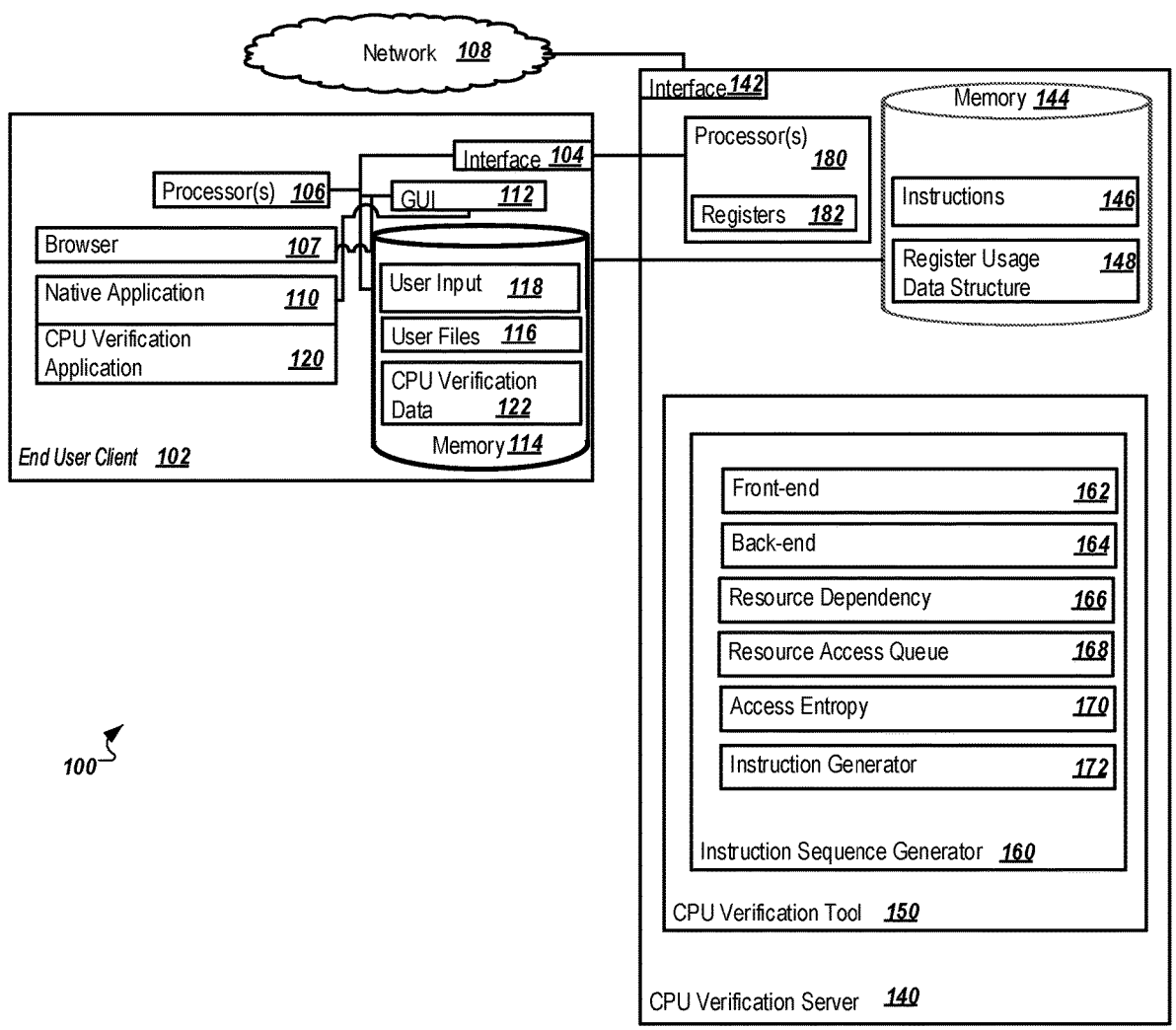
FIG. 1 is a block diagram illustrating an example system for CPU verification.

FIG. 1 is a block diagram illustrating an example system for CPU verification. Specifically, the illustrated system 100 includes or is communicably coupled with a CPU verification server 140, an end-user client device 102, and a network 108 (which can include a local area network (LAN), a wide area network (WAN), the Internet, or a combination thereof). Although shown separately, in some implementations, functionality of two or more systems, devices, or servers (e.g., the end user client device 102 and the CPU verification server 140) may be provided by a single system or server. In some implementations, the functionality of one illustrated system, server, or engine may be provided by multiple systems, servers, or engines, respectively.

The end-user client device 102 (also referred to herein as client device 102 or device 102) is an electronic device that is capable of requesting and receiving content over the network 108 or directly as shown here in FIG. 1. The end-user client device 102 can include any client computing device such as a laptop/notebook computer, wireless data port, smart phone, personal data assistant (PDA), tablet computing device, one or more processors within these devices, or any other suitable processing device that can send and receive data over the network 108. For example, the end-user client device 102 can include, for example, a computer that includes an input device, such as a keypad, touch screen, or other device that can accept user information, and an output device that conveys information, e.g., associated with the operation of the CPU verification 140, or the client device itself, including digital data, visual information, or a graphical user interface (GUI) 112.

The end-user client device 102 can include one or more applications, such as a browser 107 or a native application 110, to facilitate sending and receiving of content over the network 108. Examples of content presented at a client device 102 include compilers, interpreters, source code editors, integrated development environments (IDEs), webpages, word processing documents, portable document format (PDF) documents, images, and videos.

An end user of the end-user client device 102 may use CPU verification tool 150 located at the CPU verification server 140 to carry out one or more tasks associated with a verification of a CPU design, for example, instruction sequence generation. To do that, the end user of the client device 102 can launch a CPU verification application on the client device 102 that interfaces with and accesses the CPU verification tool 150 located at the CPU verification server 140. The end user client device 102 provides the CPU verification application 120 for display within the graphical user interface (GUI) 112.

Within the CPU verification application 120, the end user can input user input 118. The user input may specify one or more aspects of a CPU model, e.g., a software model of a CPU coded in Verilog or other hardware description language. Once the end user enters and submits the user input 118, the CPU verification tool 150 of the CPU verification server 140 receives this data. CPU verification tool 150 can be used to find design bugs in a relatively stable but not yet mature CPU designs, for example a CPU design implemented in Verilog, VHDL, or any other hardware description language (HDL). The CPU verification tool 150 processes the user input 118 to generate a sequence of instructions that can be used to test the CPU design. That is, the output of the CPU verification tool 150 can be a binary encoding of instructions and data to be loaded in the memory in the simulation of the CPU design. The CPU verification tool can use the generated instructions to simulate the CPU design and generate CPU verification data 122 that specifies the results of the CPU design verification. The CPU verification tool 150 sends the CPU verification data 122 to the client device 102.

In some implementations, the end user of the client device 102 can store the received CPU verification data 122 in a memory 114 of the client device 102 (along with the other user files 116 that may already be stored in the memory 114).

In more detail, CPU verification tool 150 at the CPU verification server 140 may receive user input 118 and use the user input 118 to execute one or more CPU verification operations, as performed by the software components of the CPU verification tool 150. For example, CPU verification tool 150 includes an instruction sequence generator 160, which is a software component that enables CPU design verification and validation.

Interfaces 104 and 142 are used by the end-user client device 102 and the CPU verification server 140, respectively, for communicating with other systems in a distributed environment—including within the system 100 connected to the network 108. Generally, each of the interfaces 104 and 142 include logic encoded in software and/or hardware in a suitable combination and operable to communicate with the network 108. More specifically, these interfaces can each include software supporting one or more communication protocols associated with communications such that the network 108 or interface's hardware is operable to communicate physical signals within and outside of the illustrated system 100.

The CPU verification server 140 includes one or more processors 180. Each processor 180 may be a central processing unit (CPU), a blade, an application specific integrated circuit (ASIC), a field-programmable gate array (FPGA), or another suitable component. Generally, each processor 180 executes instructions and manipulates data to perform the operations of the CPU verification server 140. Specifically, each processor 180 executes the functionality required to receive and respond to requests from the end-user client device 102, for example.

The CPU verification server 140 includes memory 144. In some implementations, the CPU verification server 140 includes multiple memories. The memory 144 may include any type of memory or database module and may take the form of volatile and/or non-volatile memory including, without limitation, magnetic media, optical media, random access memory (RAM), read-only memory (ROM), removable media, or any other suitable local or remote memory component. The memory 144 may store various objects or data, including video files, metadata, caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the CPU verification server 140.

The memory 144 can include a repository 146 (or another data structure) for storing instructions to be executed by the processor 180 (e.g., during execution of the simulation of the CPU design using the generated instructions). The processor 180 can include multiple registers 182. A register can hold an address at which an operand is stored as well as a value itself, and can store temporary data, an instruction being executed, a character being read in, and/or a character being written out. An instruction can include one or more operands, which indicate registers and/or memory addresses from which data is read or into which data is written. For example, an instruction describes an operation that can involve one or more source operands that are inputs for the operation and a result operand that is an output for a result that the operation may produce.

In general, the end-user client device 102 is an electronic computer device operable to receive, transmit, process, and store any appropriate data associated with the system 100 of FIG. 1. The end-user client device 102 can include one or more client applications (as described above). A client application is any type of application that allows the end-user client device 102 to request and view content on a respective client device. In some implementations, a client application can use parameters, metadata, and other information received at launch to access a particular set of data from the CPU verification server 140. In some instances, a client application may be an agent or client-side version of the one or more applications running on the CPU Verification Server 140 or another server (not shown).

The client device 102 include at least one processor 106. The processor 106 can be a central processing unit (CPU), an application specific integrated circuit (ASIC), a field-programmable gate array (FPGA), or another suitable component. Generally, processor 106 included in the end-user client device 102 executes instructions and manipulates data to perform the operations of the end-user client device 102. Specifically, processor 106 included in the end-user client device 102 executes the functionality, e.g., for sending requests, to the CPU verification server 140 and to receive and process responses from the CPU verification server 140.

GUI 112 interfaces with at least a portion of the system 100 for any suitable purpose, including generating and/or displaying a visual representation (or data that provides a visual representation) provided by the CPU verification server 140. Generally, the GUI 112 provides a user with an efficient and user-friendly presentation of data provided by or communicated within the system 100. The GUI 112 may have a plurality of customizable frames or views having interactive fields, pull-down lists, and buttons operated by the user. The GUI 112 contemplates any suitable graphical user interface, such as a combination of a generic web browser, intelligent engine, and command line interface (CLI) that processes information and efficiently presents the results to the user visually.

Memory 114 included in the end-user client device 102 may include any memory or database module and may take the form of volatile or non-volatile memory including, without limitation, magnetic media, optical media, random access memory (RAM), read-only memory (ROM), removable media, or any other suitable local or remote memory component. The memory 114 may each store various objects or data, including video files, metadata, data structures, user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the associated client device.

There may be any number of end-user client devices 102 associated with, or external to, the system 100. For example, while the illustrated system 100 includes one end-user client device 102, alternative implementations of the system 100 may include multiple end-user client devices 102 communicably coupled to the CPU verification server 140 and/or the network 108, or any other number suitable to the purposes of the system 100. Additionally, there may also be one or more additional end-user client devices 102 external to the illustrated portion of system 100 that are capable of interacting with the system 100 via the network 108. Further, the term "client," "client device," and "user" may be used interchangeably as appropriate without departing from the scope of this disclosure. Moreover, while the end-user client device 102 may be described in terms of being used by a single user, this specification contemplates that many users may use one computer, or that one user may use multiple computers.

As depicted in FIG. 1, in some implementations, the instruction sequence generator 160 includes at least the following software components: front-end 162, back-end 164, resource dependency 166, resource access queue 168, access entropy 170, and instruction generator 172. These software components can be configured to generate data hazards for instruction sequence generation, which, as described above, greatly increases the coverage of different states and functions of the CPU design, and shortens the verification cycle in the CPU design verification. Each of these software components are summarized below and described in additional detail with reference to FIGS. 2, 3A and 3B.

User input may be received at a front-end software component 162 of the instruction sequence generator 160. The front-end 162 is linked to a back-end software component 164 of the instruction sequence generator 160. In an example, a front-end 162 can be a Python layer presented via an interactive development environment (IDE) at the GUI 112 that is linked to a C++ back-end 164. In an implementation, the GUI 112 may be linked to the C++ back-end 164 utilizing a framework called pybind or another appropriate framework (e.g., Boost Python Library, SWIG, etc.).

In some implementations, the resource dependence component 166 coordinates operations according to dependency generation preferences, including a distribution of depths and dependence types, as specified in the user input 118. The resource access queue component 168 is configured to store/record the resource access history for a set of previous processing cycles and identify register constraints, where the register constraints refer to registers available for use in instructions that result in a data hazard. The access entropy component 170 is configured to interact with the resource access queue component 168 to keep track of the balance of register accesses recorded versus consumed by dependency generation.

In some implementations, the resource access queue component 168 records/stores data specifying which registers were last written or read by instructions within a specifiable length of history from (i.e., preceding) a current instruction. In some implementations, the resource access queue component 168 can also be configured for accurately reflecting which registers are currently being used by the data hazard generation process, so that they are not erroneously re-used, e.g., when generating another data hazard. In some examples, the resource access queue component 168 can include a register usage data structure for storing register usage data (or resource access history) of the registers. Alternatively, the register usage data structure can be stored in memory 144 as register usage data structure 148 and can be accessed by the resource dependency component 166, the resource access queue component 168, and/or the access entropy component 170, e.g., to read data from this data structure or write/store data in this data structure.

In some implementations, the instruction sequence generator 160 can be configured for a user to exercise control over the behavior of data hazard generation. The user can specify dependency type, statistical distribution, dependency depth, and a randomized selection algorithm (which can be used for randomly selecting registers available for use during instruction generation). For example, the instruction sequence generator 160, e.g., the front-end 162, can be configured to allow the user to specify information about data hazards to be generated, e.g., dependency type, dependency depth, and statistical distribution (each of which are described in the following paragraphs). The instruction sequence generator 160 can include provisions, e.g., in the front-end 162, for specifying value and statistical distribution of the depth, or interval in history between pairs of instructions including a data hazard to be generated.

Examples of dependency types for a data hazard include Read After Write (RAW), Write After Write (WAW), or Write After Read (WAR). For a RAW dependency type, in the program order, a register is read by one instruction after a previous instruction writes to that same register. For a WAW dependency type, in the program order, a register is written to by an instruction after a previous instruction writes to that same register. For a WAR dependency type, in the program order, a register is written to by an instruction after a previous instruction has read from that same register.

The dependency depth is defined as an interval between a pair of accesses of the same register. For example, a dependency depth of six (6) for a particular data hazard specifies an interval of 6 processing cycles between a pair of accesses to a particular register. As described above, the instruction sequence generator 160 can be configured based on the user's selection regarding the depths at which to intentionally generate data hazards and the spread of depths to be generated.

The statistical distribution refers to a distribution of dependency depths. The distribution of the dependence depths can be a Gaussian distribution, a Normal distribution, a random distribution, or any desired distribution. An example distribution can be: 10% of data dependencies at a depth of 1, 50% of data dependencies with a depth between 1 and 10, 30% of data dependencies with a depth between 11 and 20, and 10% of data dependencies with a depth 21 and 30.

The instruction generator 172 is a software component of the instruction sequence generator 160 that generates instructions that are used in the testing of the CPU design. The instruction generator 172 can be implemented using a random instruction sequence generator or another appropriate instruction sequence generator. Additionally, the instruction generator 172 coordinates and interacts with the resource dependency, resource access queue, and access entropy components 166, 168, 170 to generate instructions according to specified data hazards and using the register usage data (as further described with reference to FIGS. 2, 3A and 3B).

The access entropy component 170 of the instruction sequence generator 160 is configured to automatically enable or disable data hazard generation based on the history of reads and writes with respect to the various registers. The instruction sequence generator 160 can also include a provision, e.g., in the front-end component 162 or the resource dependency component 166, for the user to specify information including register read and write counts to be considered as activation and deactivation thresholds for data hazard generation. The access entropy component 170 maintains and references an entropy to determine whether the entropy satisfies an activation or deactivation threshold. In this context, entropy refers to the count/number of registers that are not accessed twice in succession with alternating reads and writes. The activation and deactivation thresholds can then be used by the access entropy component 170 and/or other software components in the instruction sequence generator 160 to modulate data hazard generation. For example, the resource access queue component 168 can query the access entropy component 170 to obtain the entropy to determine whether the entropy is below an activation threshold specified by the user. If the entropy is below the specified activation threshold, the dependency generation is disabled until the entropy is stable (e.g., the entropy is at or above the activation threshold, which would happen when the count/number of registers not accessed twice in succession with alternating reads and writes, equals or exceeds the activation threshold).

In this manner, the instruction sequence generator 160 can realize automatic pausing and resuming of dependency generation, which allows a given test to more sustainably produce a higher volume of high depth data hazards within a given test.

In some implementations, the instruction sequence generator 160 can implement a randomized and customizable selection algorithm (e.g., a round-robin algorithm, greedy selection, or another appropriate random selection algorithm), which governs the selection of resources (e.g., registers) to generate a data hazard. The randomized selection algorithm can select registers to access in the next instruction to be generated. As part of this random selection, the instruction sequence generator 160 can randomly select (1) a dependency depth from among the dependency depths specified by the user, (2) a type of data hazard to produce from among the different data hazard types specified by the user, (3) the activation/deactivation thresholds, which trigger when to begin generating data hazards and when to cease, and (4) the types of instructions or specific instructions for which data hazards are selected. In this manner, the instruction sequence generator 160 randomly selects a register that satisfies the criteria specified by the user. Alternatively, in some implementations, the instruction sequence generator 160 uses the first register (i.e., it does not do any further processing after finding this register, e.g., to find other registers) that it determines to meet the criteria for the data hazard generation.

Additional details regarding generating data hazards during instruction sequence generation are described below with reference to FIGS. 2, 3A and 3B.

Figure 2:
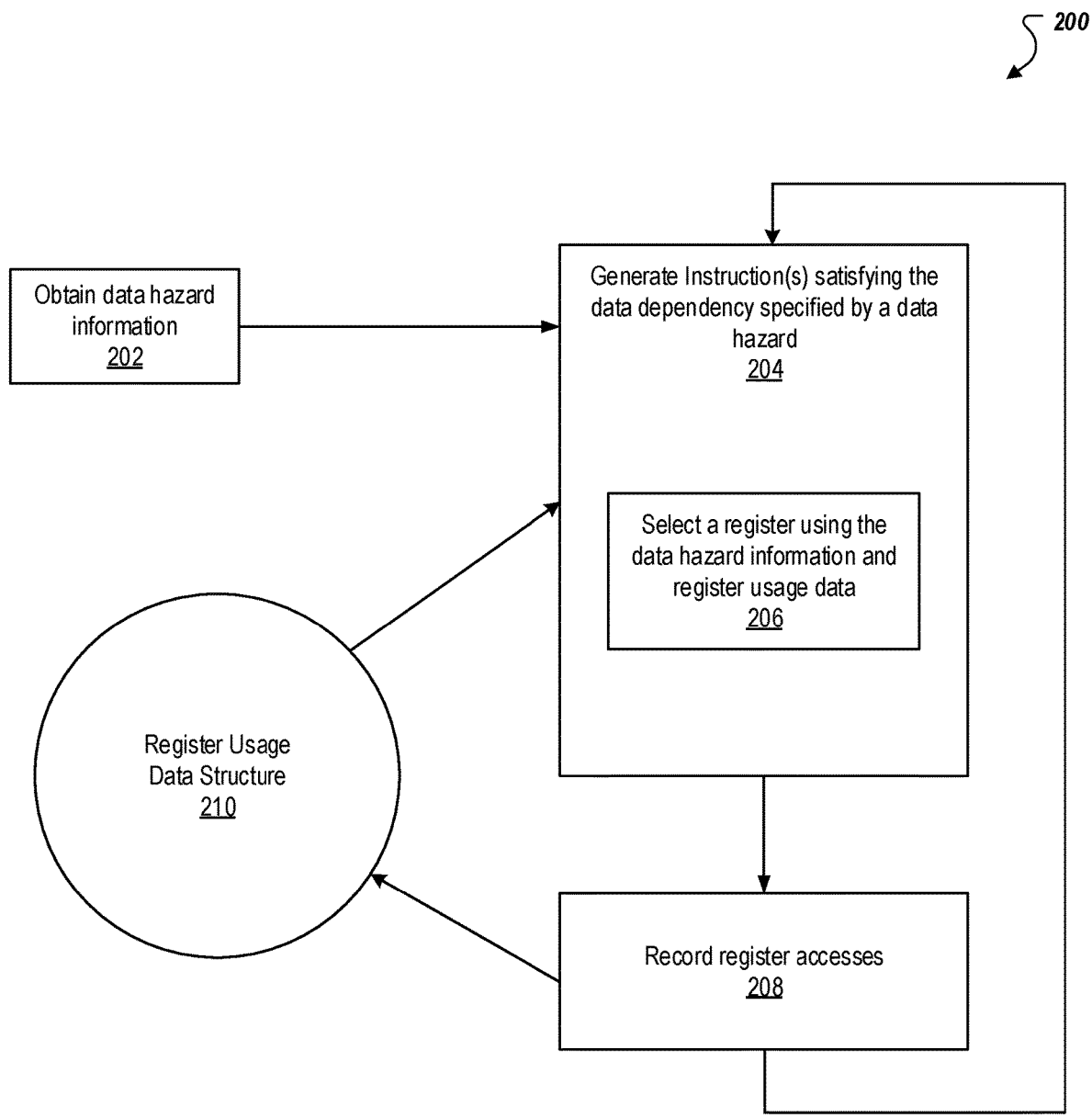
FIG. 2 is a schematic diagram of an example process of data hazard generation for instruction sequence generation.

FIG. 2 is a schematic diagram of an example process 200 of data hazard generation for instruction sequence generation. Operations of process 200 are described below as being performed by the components of the system described and depicted in FIG. 1. Operations of the process 200 are described below for illustration purposes only. Operations of the process 200 can be performed by any appropriate device or system, e.g., any appropriate data processing apparatus. Operations of the process 200 can also be implemented as instructions stored on a non-transitory computer readable medium. Execution of the instructions causes one or more data processing apparatus to perform operations of the process 200. In some implementations, the process 200 is implemented in and performed by an instruction sequence generator such as the instruction sequence generator 160 of FIG. 1, which include multiple software components (as depicted and described with reference to FIG. 1).

The instruction sequence generator 160 obtains 202 data hazard information defining a data hazard to be generated during instruction generation. In some implementations, the data hazard information can be obtained by receiving a user input (e.g., user input 118), through the front-end component 162 of the instruction sequence generator 160, from a user, such as a verification engineer of a CPU design. The received user input can specify data hazard information for multiple data hazards to be generated during instruction sequence generation. As described above, a data hazard specifies a data dependency between a pair of instructions (i.e., a first instruction and a second instruction occurring after the first instruction). The data hazard information can include at least one of: a dependency type of the data hazard, a dependency depth of the data hazard, or a statistical distribution of dependency depths of data hazards to be generated among instruction sequences, as described above with reference to FIG. 1. In some implementations, the data hazard information is passed to the other components of the instruction sequence generator 160, such as resource dependency 166, resource access queue 168, access entropy 170, and instruction generator 172.

The instruction sequence generator generates 204 an instruction, which is to be executed in a current processing cycle, that satisfies the data dependency specified by the data hazard based on the data hazard information. As described with reference to FIG. 1, the instruction sequence generator 160 (and in particular, the resource access queue component 168 maintains a register usage data structure 210 that stores register usage data (or register access data or history) for a plurality of registers, e.g., the registers 182 of FIG. 1. The register usage data structure 210 can be included and stored as part of the resource access queue component of the instruction sequence generator, e.g., the resource access queue component 168 of FIG. 1. In some implementations, the register usage data structure 210 can be also included in a memory, e.g., the register usage data structure 148 in the memory 144 of FIG. 1. The register usage data specifies, for each register of the plurality of registers, whether data was read from or written into the register in a plurality of preceding processing cycles (i.e., processing cycles prior to the current processing cycle that is being executed). An example of the register access data structure 210 is provided in FIG. 3A.

Figure 3A:
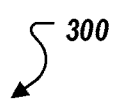
FIG. 3A is a schematic diagram of an example register usage data structure of a plurality of registers.

FIG. 3A is a schematic diagram of an example register usage data structure 300 that stores register usage data (or register access data or history) for a plurality of registers. The register usage data structure 300 includes register usage data of a current processing cycle (history slot 0) and of five preceding processing cycles (history slots 1-5) before the current processing cycle. For each processing cycle, the register usage data specifies data read from the various registers and data written into the various registers. For example, at the fifth preceding processing cycle (history slot 5), data is read from register R4 and data is written into the register R5. As another example, at the fourth preceding processing cycle (history slot 4), data is read from register R21 and data is written into register R24.

Referring back to FIG. 2, in some implementations, the instruction sequence generator 160 (and in particular, the instruction generator 172) interacts with the resource dependency and resource access queue components to select 206 a register for use in an instruction to be generated in the current processing cycle, where register selection is based on the data hazard information (obtained at operation 202 and made available to the resource dependency component) and the register usage data (e.g., as accessed or provided by the resource access queue component). In some implementations, the instruction generator 172 generates an instruction for executing in the current processing cycle by selecting a register that satisfies the data hazard/dependency specified by the user and the register usage data, e.g., the register usage data of the plurality of registers stored in the register usage data structure 210 (e.g., as depicted in FIG. 3A), and generating the instruction that accesses the register. This selection operation is further described below.

For example, if a user has specified generation of a data hazard having a dependency type of Read After Write and a dependence depth of 6, the instruction sequence generator 160 (and in particular, the instruction generator 172) can use this information to search the register usage data structure in the resource access component 168 to identify register(s) that satisfy the specified data dependency type and dependency depth for this data hazard. The register usage data (or register access data or history) of the registers, as depicted in FIG. 3A, currently only has a history of 5 preceding processing cycles, which is less than the dependence depth specified by the data hazard, i.e., 6. Thus, the instruction generator 172 determines that none of the registers in FIG. 3A currently satisfy the data dependency depth requirement for the data hazard. In this manner, the resource dependency component determines, for purposes of the current processing cycle, the register usage data of each of the registers in a set of preceding processing cycles.

In some implementations, upon determining that the specified data hazard cannot be satisfied in the current processing cycle, the resource dependency component 166 passes a message to the instruction generator 172, indicating that a register is not available for generation of the data hazard. In response, the instruction generator 172 generates an instruction for the current processing cycle without regard to the specified data hazard (e.g., by using any available register for the instruction).

After the current processing cycle, e.g., the history slot 0 in FIG. 3A, has been executed, the register access data structure 210 is updated by the instruction sequence generator 160, and in particular, by the resource access queue component 168 (in the manner described above with reference to FIG. 1 and as further described below with reference to operation 208) to specify the registers that were accessed during that cycle. In this example, the resource access queue component 168 updates the register usage data structure by specifying that in the current processing cycle, data in register R8 was read and data was written in register R9 (as shown in FIG. 3A).

At this point, the register usage data structure has a history of 6 preceding processing cycles (as shown and described with reference to FIG. 3B). The instruction sequence generator 160 (and in particular, the resource dependency component 166) searches, based on the updated register usage data structure, to determine if a register can be identified that satisfies the data hazard type (Read After Write) of the specified depth (depth=6). This operation and corresponding processing is illustrated using FIG. 3B described below.

Figure 3B:
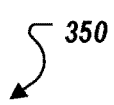
FIG. 3B is a schematic diagram of another example register usage data structure of a plurality of registers.

FIG. 3B is a schematic diagram of another example register usage data structure 350 for a plurality of registers. The register usage data structure 350 is an updated version of register usage data structure 300, reflecting the usage data of the registers from the current processing cycle in FIG. 3A within the history slot 1 in FIG. 3B (which now includes reading data from R8 and writing data in R9). As shown in FIG. 3B, the register usage data structure 350 includes 6 preceding processing cycles, which is enough register usage data to satisfy the dependency depth (of 6), as specified in the above data hazard. Again, the instruction sequence generator 160 (and in particular, the resource dependency component 166) uses the data hazard information to search the currently-updated register usage data structure 350 to identify a register that meets the criteria of the dependency type and depth. In this example, register R5 was written into at the sixth preceding processing cycle (history slot 6) and is available to be read from in the current processing cycle (history slot 0). Reading data from the R5 register for the instruction to be generated and executed in the current processing cycle satisfies the data hazard's dependency type of Read After Write (because data is being read from this register after data was previously written into it) and dependency depth of 6 (because the read in the current processing cycle is separated by the previous write access to this register by 6 processing cycles). Accordingly, in this example, the instruction sequence generator 160 (and in particular, the resource dependency component 166) selects register R5. In some implementation, the resource dependency component 166 passes a message to the instruction generator 172, specifying the selected register (R5 in this example) that is available for generating the data hazard. The instruction generator 172 in turn uses this register in generating the instruction that satisfies the data dependencies in the data hazard specified by the user.

In some implementations, the instruction sequence generator 160 (and in particular, the resource dependency component 166) can disregard a particular register that otherwise meets the parameters of a data hazard (e.g., the dependency type, depth, etc.) because that register may have been accessed during execution of another intervening instruction. That is not the case in the data structure illustrated in FIG. 3B because, between the processing cycles of slot 6 and slot 0, register R5 has not been accessed, e.g., during execution of another instruction, in any of the intervening processing cycles. However, as an example, if register R5 was read from between the processing cycles of slots 0 and 6 (e.g., at slot 3 corresponding to the third preceding processing), the instruction sequence generator will not utilize register R5 in generating the instruction to satisfy the data hazard. Instead, the instruction sequence generator (e.g., the resource dependency component 166) will either search for another register that meets the data hazard's parameters or will instruct the instruction generator 172 to execute instructions in the current processing cycle without regard to data hazard generation and determine in the next processing cycle whether the data hazard can be satisfied.

Similarly, in some implementations, the instruction sequence generator 160 (and in particular, the resource dependency component 166) selects a particular register from among the plurality of registers that is not being used in instruction generation related to another data hazard. Conversely, in such implementations, if a particular register meets the criteria for a data hazard but is being used in connection with another data hazard, the instruction sequence generator does not utilize that particular register. Instead, in this instance, the resource dependency component 166 either searches for another register that meets the data hazard's parameters or instructs the instruction generator 172 to execute instructions in the current processing cycle and then determines in the next processing cycle whether the data hazard can be satisfied.

In some implementations, as described with reference to FIG. 1, the instruction sequence generator 160 can include an access entropy component, e.g., the access entropy component 170 of FIG. 1. The instruction sequence generator (e.g., the access entropy component) can automatically enable or disable data hazard generation based upon contents of the register usage history of reads and writes on registers. When the user specifies the data hazard information, the user can also specify information including register read and write counts to be considered as activation and deactivation thresholds for data hazard generation (which were described above with reference to FIG. 1 and are further described below). In such implementations, prior to generating the instruction, the instruction sequence generator 160 (and in particular, the access entropy component) can determine a count of registers in a plurality of registers which (1) have been accessed in a first set of preceding processing cycles and (2) have not been re-accessed in a second set of preceding processing cycles, where the second set of preceding processing cycles follow the first set of preceding processing cycles. In response to determining that count of registers in the plurality of registers satisfies (e.g., meets or exceeds) the particular activation threshold, the access entropy component 170 can instruct the resource dependency component to identify a data hazard. If the resource dependency component then identifies a register that satisfies the data hazard (in the manner described above), it passes the identified register to the instruction generator 172, which then generates an instruction using the identified register in a manner that satisfies the data dependency specified by the data hazard. On the other hand, in response to determining that count of registers in the plurality of registers does not satisfy (e.g., is less than) the particular activation threshold, the access entropy component 170 can deactivate data hazard generation and can instruct the instruction generator 172 to generate instructions without regarding to satisfying any data hazards specified by the user.

Returning to FIG. 2, the instruction sequence generator 160 updates the register usage data of each of the plurality of registers with the usage data from the current processing cycle. Specifically, in some implementations, after an instruction is executed, the instruction sequence generator 160 (and in particular, the resource access queue component 168) records 208 data about the register accesses (or register usage data) for the various registers in the current processing cycle, e.g., as shown in FIG. 3B, where data is read from registers R5 and R11 and written into register R2, and updates the register usage data structure using this data. In this way, the register usage data is dynamically updated and subsequent instruction generation (and the associated data hazard generation) utilizes the most current register usage data structure in generating instructions that satisfy the specified data hazards.

Figure 4:
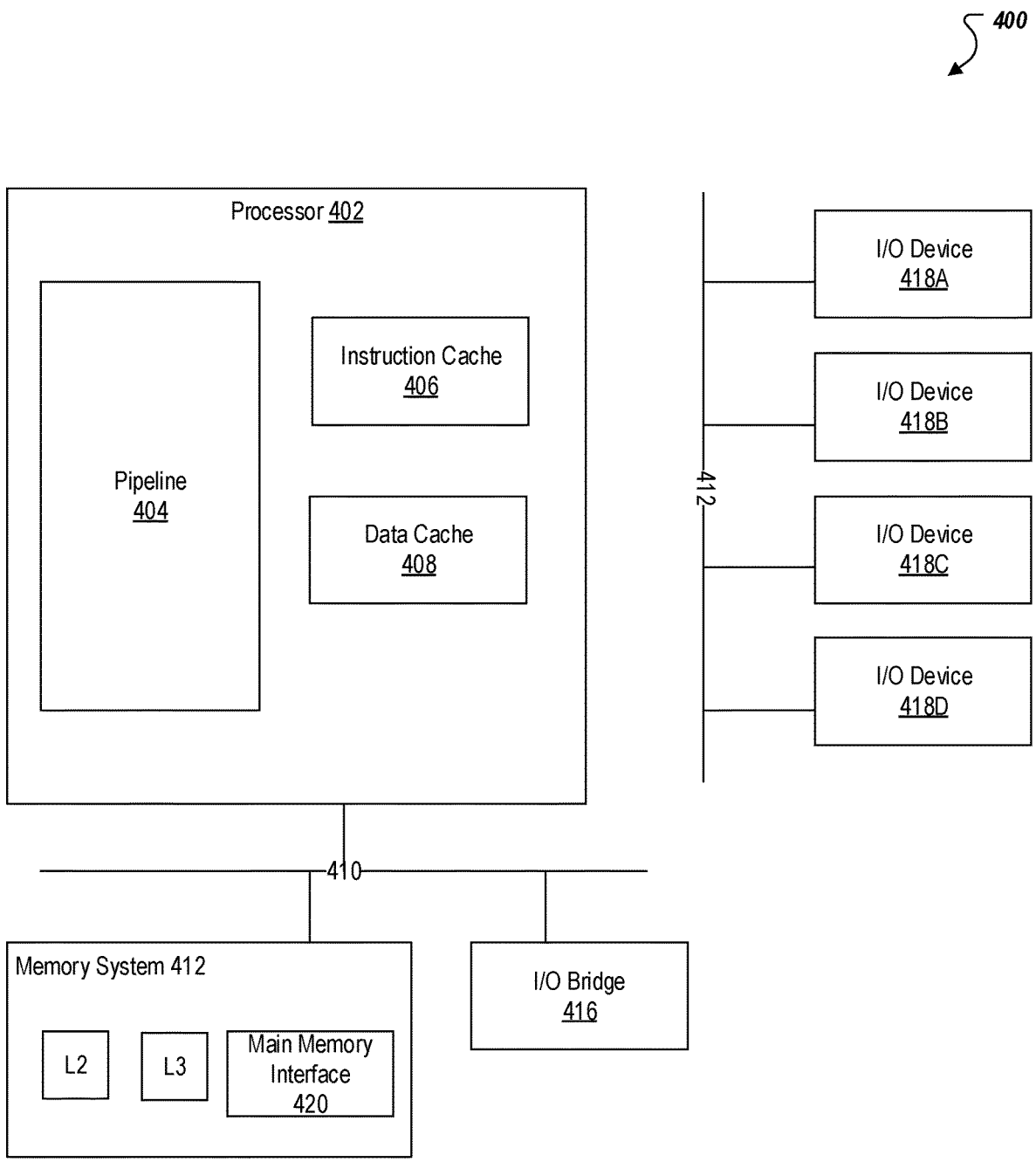
FIG. 4 is a schematic diagram of an example microprocessor based computing device on which a CPU verification tool can be implemented.

FIG. 4 shows an example of a computing system that contains a microprocessor. The techniques described in this specification can be implemented to run on the computing system to verify the functional correctness of the same or another microprocessor design. The computing system 400 includes at least one processor 402, which could be a single central processing unit (CPU) or an arrangement of multiple processor cores of a multi-core architecture.

In the depicted example, the processor 402 includes a pipeline 404, an instruction cache 406, and a data cache 408 (and other circuitry, not shown). The processor 402 is connected to a processor bus 410, which enables communication with an external memory system 412 and an input/output (I/O) bridge 416. The I/O bridge 416 enables communication over an I/O bus, with various different I/O devices 418A-418D (e.g., disk controller, network interface, display adapter, and/or user input devices such as a keyboard or mouse).

The external memory system 412 is part of a hierarchical memory system that includes multi-level caches, including the first level (L1) instruction cache 406 and data cache 408, and any number of higher level (L2, L3, etc.) caches within the external memory system 412. Other circuitry (not shown) in the processor 402 supporting the caches 406 and 408 includes a translation lookaside buffer (TLB), various other circuitry for handling a miss in the TLB or the caches 406 and 408. For example, the TLB is used to translate an address of an instruction being fetched or data being referenced from a virtual address to a physical address, and to determine whether a copy of that address is in the instruction cache 406 or data cache 408, respectively. If so, that instruction or data can be obtained from the L1 cache. If not, that miss is handled by miss circuitry so that it may be executed from the external memory system 412. It is appreciated that the division between which level caches are within the processor 402 and which are in the external memory system 412 can differ in various examples. For example, an L1 cache and an L2 cache may both be internal and an L3 (and higher) cache could be external. The external memory system 412 also includes a main memory interface 420, which is connected to any number of memory modules (not shown) serving as main memory (e.g., Dynamic Random Access Memory modules).

Figure 5:
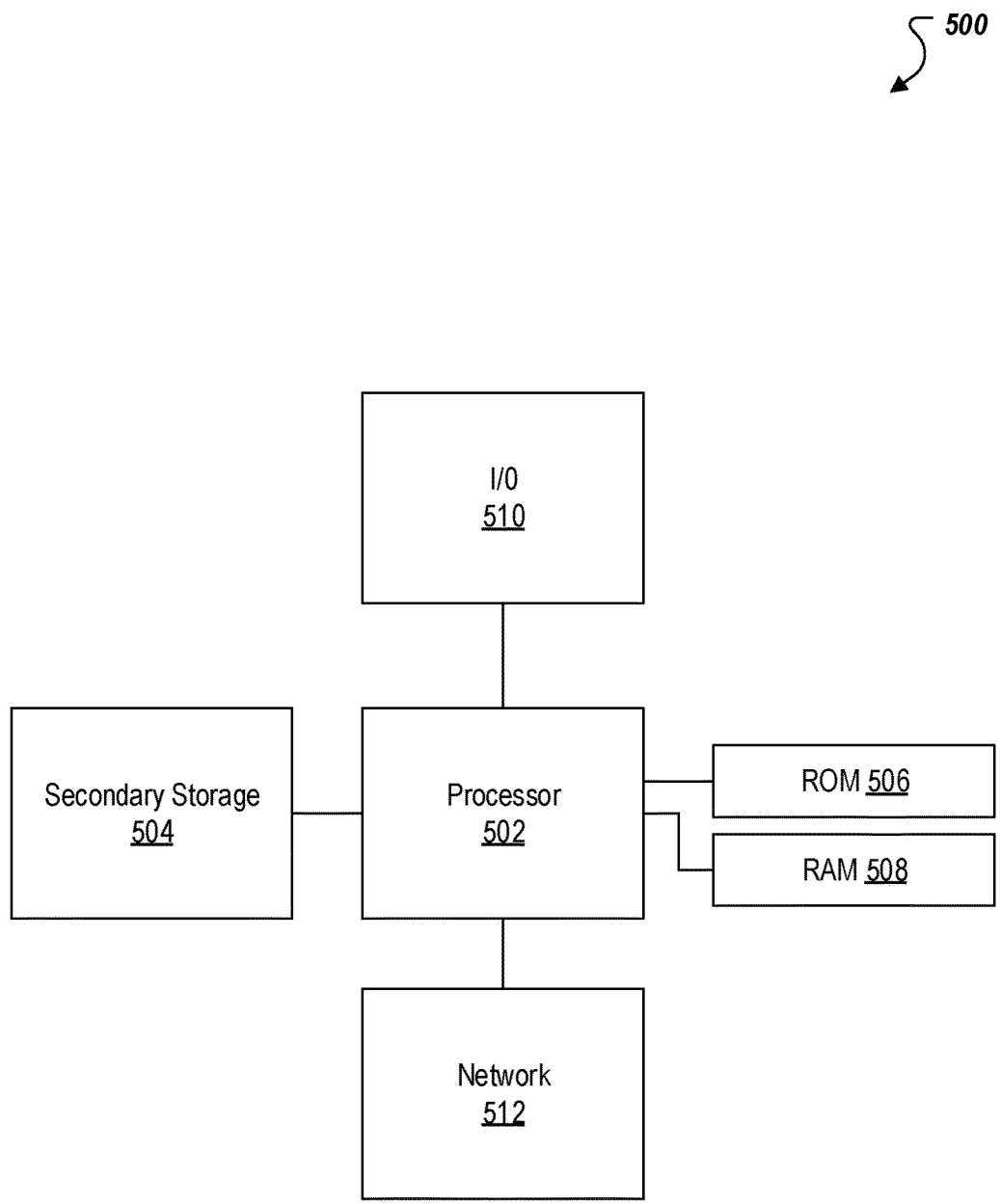
FIG. 5 is a schematic diagram of a general purpose network component or computer system.

FIG. 5 illustrates a schematic diagram of a general-purpose network component or computer system. The general-purpose network component or computer system 500 includes a processor 502 (which may be referred to as a central processor unit or CPU) that is in communication with memory devices including secondary storage 504, and memory, such as ROM 506 and RAM 508, input/output (I/O) devices 510, and a network 512, such as the Internet or any other well-known type of network, that may include network connectivity devices, such as a network interface. Although illustrated as a single processor, the processor 502 is not so limited and may comprise multiple processors. The processor 502 may be implemented as one or more CPU chips, cores (e.g., a multi-core processor), FPGAs, ASICs, and/or DSPs, and/or may be part of one or more ASICs. The processor 502 may be configured to implement any of the schemes described herein. The processor 502 may be implemented using hardware, software, or both.

The secondary storage 504 is typically comprised of one or more disk drives or tape drives and is used for non-volatile storage of data and as an over-flow data storage device if the RAM 508 is not large enough to hold all working data. The secondary storage 504 may be used to store programs that are loaded into the RAM 508 when such programs are selected for execution. The ROM 506 is used to store instructions and perhaps data that are read during program execution. The ROM 506 is a non-volatile memory device that typically has a small memory capacity relative to the larger memory capacity of the secondary storage 504. The RAM 508 is used to store volatile data and perhaps to store instructions. Access to both the ROM 506 and the RAM 508 is typically faster than to the secondary storage 504. At least one of the secondary storage 504 or RAM 508 may be configured to store routing tables, forwarding tables, or other tables or information disclosed herein.

It is understood that by programming and/or loading executable instructions onto the node 500, at least one of the processor 502 or the memory (e.g. ROM 506, RAM 508) are changed, transforming the node 500 in part into a particular machine or apparatus, e.g., a router, having the novel functionality taught by the present disclosure. Similarly, it is understood that by programming and/or loading executable instructions onto the node 500, at least one of the processor 502, the ROM 506, and the RAM 508 are changed, transforming the node 500 in part into a particular machine or apparatus, e.g., a router, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The technology described herein can be implemented using hardware, firmware, software, or a combination of these. The software used is stored on one or more of the processor readable storage devices described above to program one or more of the processors to perform the functions described herein. The processor readable storage devices can include computer readable media such as volatile and non-volatile media, removable and non-removable media. By way of example, and not limitation, computer readable media may comprise computer readable storage media and communication media. Computer readable storage media may be implemented in any method or technology for storage of information such as computer readable instructions, data structures, program modules or other data. Examples of computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. A computer readable medium or media does (do) not include propagated, modulated or transitory signals.

Communication media typically embodies computer readable instructions, data structures, program modules or other data in a propagated, modulated or transitory data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as RF and other wireless media. Combinations of any of the above are also included within the scope of computer readable media.

In alternative embodiments, some or all of the software can be replaced by dedicated hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), special purpose computers, etc. In one embodiment, software (stored on a storage device) implementing one or more embodiments is used to program one or more processors. The one or more processors can be in communication with one or more computer readable media/storage devices, peripherals and/or communication interfaces.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. Software components described in this specification include programmable instructions that are stored in a non-transitory computer readable medium and are executed by a processor or another data processing apparatus.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method, comprising:
   obtaining data hazard information defining a data hazard to be generated during computer instruction generation, wherein the data hazard specifies a data dependency between a first instruction and a second instruction occurring after the first instruction; and
   generating, based on the data hazard information and register usage data of a plurality of registers, an instruction to access a particular register for execution in a current processing cycle that satisfies the data dependency specified by the data hazard,
   wherein the register usage data specifies, for each register of the plurality of registers, whether data was read from or written into a register of the plurality of registers in a plurality of processing cycles preceding the current processing cycle.

2. The computer-implemented method of claim 1, wherein the data hazard information defining the data hazard comprises at least one of:
   a dependency type of the data hazard;
   a dependency depth of the data hazard; or
   a statistical distribution of dependency depths of data hazards to be generated among instruction sequences.

3. The computer-implemented method of claim 2, wherein the dependency type of the data hazard comprises one of: read-after-write, write-after-write, or write-after-read.

4. The computer-implemented method of claim 1, further comprising:
   determining, for each processing cycle of the plurality of processing cycles, corresponding usage data of each of the plurality of registers; and
   updating the register usage data of the plurality of registers with the corresponding usage data of each of the plurality of registers.

5. The computer-implemented method of claim 1, wherein the register usage data of the plurality of registers is stored in a register usage data structure, and
   wherein generating the instruction that satisfies the data dependency specified by the data hazard comprises:
      selecting, using data in the register usage data structure, the particular register that satisfies the data dependency specified by the data hazard.

6. The computer-implemented method of claim 5, wherein selecting the particular register comprises:
   selecting the particular register from among the plurality of registers that is not being used in instruction generation related to another data hazard.

7. The computer-implemented method of claim 1, further comprising:
   prior to generating the instruction that satisfies the data dependency specified by the data hazard, determining a count of registers in the plurality of registers which (1) have been accessed in a first set of processing cycles and (2) have not been re-accessed in a second set of processing cycles, wherein the current processing cycle follows the second set of processing cycles, and wherein the second set of processing cycles follow the first set of processing cycles, and
   wherein generating the instruction that satisfies the data dependency specified by the data hazard comprises:
   in response to determining that the count of registers in the plurality of registers satisfies a particular threshold, generating the instruction that satisfies the data dependency specified by the data hazard.

8. The computer-implemented method of claim 7, wherein the data hazard information comprises the particular threshold.

9. The computer-implemented method of claim 1, wherein obtaining the data hazard information defining the data hazard to be generated comprises:
   receiving a user input specifying the data hazard information.

10. One or more non-transitory computer-readable media having instructions stored thereon which, when executed by one or more processors, cause the one or more processors to perform operations comprising:
   obtaining data hazard information defining a data hazard to be generated during computer instruction generation, wherein the data hazard specifies a data dependency between a first instruction and a second instruction occurring after the first instruction; and
   generating, based on the data hazard information and register usage data of a plurality of registers, an instruction to access a particular register for execution in a current processing cycle that satisfies the data dependency specified by the data hazard,
   wherein the register usage data specifies, for each register of the plurality of registers, whether data was read from or written into a register of the plurality of registers in a plurality of processing cycles preceding the current processing cycle.

11. The one or more non-transitory computer-readable media of claim 10, wherein the data hazard information defining the data hazard comprises at least one of:
   a dependency type of the data hazard;

a dependency depth of the data hazard; or a statistical distribution of dependency depths of data hazards to be generated among instruction sequences.

12. The one or more non-transitory computer-readable media of claim 11, wherein the dependency type of the data hazard comprises one of: read-after-write, write-after-write, or write-after-read.

13. The one or more non-transitory computer-readable media of claim 10, the operations further comprising:
  determining, for each processing cycle of the plurality of processing cycles, corresponding usage data of each of the plurality of registers; and
  updating the register usage data of the plurality of registers with the corresponding usage data of each of the plurality of registers.

14. The one or more non-transitory computer-readable media of claim 10, wherein the register usage data of the plurality of registers is stored in a register usage data structure, and
  wherein generating the instruction that satisfies the data dependency specified by the data hazard comprises:
    selecting, using data in the register usage data structure, the particular register that satisfies the data dependency specified by the data hazard.

15. The one or more non-transitory computer-readable media of claim 14, wherein selecting the particular register comprises:
  selecting the particular register from among the plurality of registers that is not being used in instruction generation related to another data hazard.

16. The one or more non-transitory computer-readable media of claim 10, the operations comprising:
  prior to generating the instruction that satisfies the data dependency specified by the data hazard, determining a count of registers in the plurality of registers which (1) have been accessed in a first set of processing cycles and (2) have not been re-accessed in a second set of processing cycles, wherein the current processing cycle follows the second set of processing cycles, and wherein the second set of processing cycles follow the first set of processing cycles, and
  wherein generating the instruction that satisfies the data dependency specified by the data hazard comprises:
    in response to determining that the count of registers in the plurality of registers satisfies a particular threshold, generating the instruction that satisfies the data dependency specified by the data hazard.

17. The one or more non-transitory computer-readable media of claim 16, wherein the data hazard information comprises the particular threshold.

18. The one or more non-transitory computer-readable media of claim 10, wherein obtaining the data hazard information defining the data hazard to be generated comprises:
  receiving a user input specifying the data hazard information.

19. A system, comprising:
  one or more processors; and
  a non-transitory computer-readable media device coupled to the one or more processors and having instructions stored thereon which, when executed by the one or more processors, cause the one or more processors to perform operations comprising:
  obtaining data hazard information defining a data hazard to be generated during computer instruction generation, wherein the data hazard specifies a data dependency between a first instruction and a second instruction occurring after the first instruction; and
  generating, based on the data hazard information and register usage data of a plurality of registers, an instruction to access a particular register for execution in a current processing cycle that satisfies the data dependency specified by the data hazard,
  wherein the register usage data specifies, for each register of the plurality of registers, whether data was read from or written into a register of the plurality of registers in a plurality of processing cycles preceding the current processing cycle.

20. The system of claim 19, wherein the register usage data of the plurality of registers is stored in a register usage data structure, and
  wherein generating the instruction that satisfies the data dependency specified by the data hazard comprises:
    selecting, using data in the register usage data structure, the particular register that satisfies the data dependency specified by the data.

* * * * *